3,678,006
CURABLE POLYPHENYLENE COPOLYMERS
AND RESIN COMPOSITIONS
Norman Bilow, Los Angeles, Calif., assignor to Hughes Aircraft Company, Culver City, Calif.
No Drawing. Continuation-in-part of application Ser. No. 782,002, Dec. 6, 1968. This application Jan. 7, 1971, Ser. No. 104,777
Int. Cl. C08g 33/00, 33/10
U.S. Cl. 260—47 R
9 Claims

ABSTRACT OF THE DISCLOSURE

An improved new class of polyphenylene copolymers, terpolymers and quaterpolymers modified with an alkyl and/or aryl phenolic compound and/or aromatic amine curable to useful coating, bonding and molded resins with curing agents generally applicable to phenolic resins.

This invention relates to the method of preparing improved resin forming modified polyphenylene copolymers and products thereof. More particularly, this invention relates to and provides a method of preparing new resin forming polyphenylene copolymers which are curable by methods generally applicable to phenolic resins, and the products produced thereby.

This application is a continuation-in-part of Ser. No. 782,002, filed Dec. 6, 1968 and now abandoned.

BACKGROUND OF THE INVENTION

The preparation and applicable use of resinous aromatic copolymers of biphenyl, m-terphenyl, o-terphenyl, quaterphenyl, naphthalene, anthracene, phenanthrene, benzanthracene, mixtures thereof and mixtures thereof with other soluble, fusible phenylene telomers polymerized with a catalyst such as ferric chloride, or catalyst mixtures such as a mixture of aluminum chloride with cupric chloride, and curable to useful high temperature resistant coating and molding resins with xylyleneglycol and catalyst or aromatic sulfonyl halides and the corresponding acids has been disclosed in the copending applications of Norman Bilow and Leroy J. Miller Ser. No. 665,262 (now abandoned for continuation-in-part 27,178, filed Apr. 9, 1970), Norman Bilow Ser. No. 665,261 (abandoned for continuation-in-part 104,818, filed Jan. 7, 1971), Norman Bilow and Leroy J. Miller Ser. No. 665,578 (Pat. 3,555,-108, filed Sept. 5, 1967), Norman Bilow and Leroy J. Miller Ser. No. 665,267 (Pat. 3,578,611, filed Sept. 5, 1967), Norman Bilow and Leroy J. Miller Ser. No. 665,269 (abandoned for continuation-in-part 112,829, filed Feb. 4, 1971) and Norman Bilow Ser. No. 665,284 (abandoned for continuation-in-part 104,770, filed Jan. 7, 1971), and related subject matters included herein by reference thereto.

The polyphenylene monomer and polymer preparations thereof, as disclosed in the above applications can be modified, as provided herein, and such preparations are included herein, by reference thereto, with modification as described, and the curing thereof as provided herein.

Otherwise, the prior art has provided coal-like products, antioxidants, germicides, and other non-resinous or non-resin forming products, as such, by different reactions of biphenyl and phenol compounds, including insoluble and infusible polymer derivatives of benzene and polyphenyls.

The new soluble, fusible, heat setting polyphenylene polymers heretofore provided in the molecular weight range of 1000±500 to about 3000 are particularly suitable for producing high temperature resisting coating and molded resinous products when cured with an aromatic polymethylol and acid catalyst combination, or otherwise cured by the aromatic sulfonyls and sulfonyl halides as disclosed in the above applications. However, for practical and commercial application, there is need for the provision of new soluble, fusible, polyphenylene copolymers which are curable with improved adherence or bonding under conditions generally applicable to phenolic resins and affording more economical aromatic resins which are soluble and fusible and cure under more conventional practice with more conventional curing agents and under temperatures, or temperature and pressure conditions, practiced therewith.

SUMMARY OF THE INVENTION

According to the practice of this invention, biphenyl, m-terphenyl, o-terphenyl, quaterphenyl, naphthalene, anthracene, phenanthrene, benzanthracene, mixtures thereof, and mixtures thereof with other fusible phenylene telomers of not more than about 5 aromatic rings are polymerized with catalysts such as ferric chloride, or catalyst mixtures such as aluminum chloride-cupric chloride. Included in these phenylene mixtures is a phenolic compound such as phenol, phenylphenol, catechol, resorcinol, naphthol, various meta substituted alkyl or aryl phenols such as m-cresol, meta ethyl phenol, paraphenyl phenol, meta propyl phenol, meta isopropyl phenol, meta butyl phenol, and the like; aromatic amines such as N,N-dimethylaniline, N,N,N',N' - tetramethyl-p,p'-diaminobiphenyl, various meta substituted alkyl or aryl N,N-dialkylanilines and the like; or mixtures of the phenolic compound and the aromatic amine can be used to modify the polyphenylene monomers and polymers. Otherwise, the phenol and amine modified polyphenylene monomers and polymers can be mixed for curing with a suitable selective mutual curing agent.

The concentrations of the phenolic compound and/or aromatic amine can be prepared with the polyphenylenes in proportions in the range of as little as 1% or may be about 20–30%, and preferably not over 50%, depending upon the physical properties, curing properties, or chemical properties which the particular investigator desires. Other less preferred modification of the polyphenylene polymers, as herein provided, may be prepared with somewhat higher concentrations of the phenolic and/or aromatic amine compounds up to 90%.

Copolymers, terpolymers, or quaterpolymers of these types which are soluble in chlorinated solvents and the like, after modification can be treated with conventional selective or mutually reactive curing agents such as hexamethylenetetramine, toluenediisocyanate, or the diglycidyl ether of bisphenol A, or a xylyleneglycol and acid catalyst combination in monomer or prefabricated combination form, or mixtures of curing agents including hexamethylenediamine and a xylyleneglycol in combination with an acid catalyst, to produce soluble, fusible curable and cured polyphenylene compositions with or without compatible natural or synthetic filler material in admixture therewith. Such filler material may be reactive or nonreactive natural or synthetic resinous material, or inert solids of organic or inorganic material.

The xylene glycol and sulfonic acid catalyst is preferably a preparation as exemplified in Example 15, and further described and illustrated in the above-indicated applications Ser. Nos. 665,267; 665,284; and 665,578 (as above indicated) and comprises a polymethylol-aromatic compound of the character of polyoxyxylene and derivatives having the base ring structural formula

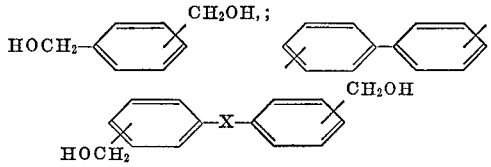

and mixtures of the same, and X is selected from the group consisting of oxygen, sulfur

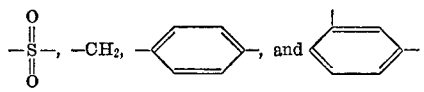

and the like as disclosed in the copending application for "Self Curing Resinous Catalyst System and Method," Ser. No. 665,303 (abandoned for continuation-in-part 69,169, filed Sept. 2, 1970), of Leroy J. Miller, and in which I am co-inventor. The additional ring substituents may be non-interfering hydrogen, alkyl, aryl, alkaryl, arylalkyl, alkoxy, aryloxy, and partially halogenated derivatives thereof. By non-interfering, reference is made to non-steric interference or hinderance, or otherwise the reaction is contemplated as being through the additional ring substituents as unsaturated side chain groups.

As the acid catalysts portion of the curing agent, we preferably employ aromatic sulfonic acids such as p-toluenesulfonic acid, benzene sulfonic acid, acetamidobenzenesulfonic acid, hexanesulfonic acid, cyclohexane sulfonic acid, and mixtures thereof, including mixtures with less preferable acids.

Less preferably, we may otherwise employ phosphoric acids, alkylphosphonic acids, arylphosphonic acids, alkylphosphonous acids, arylphosphonous acids, sulfuric acid, sulfurous acid, alkyl- and arylcarboxylic acids, partially halogenated derivatives of these proper acids, and mixtures of such acids. In respect to the curing agent addition, we may utilize an excess effecting an initial reaction with retention of a portion of the catalyst to effect subsequent cure. Otherwise, the acid addition may be in proportion to effect initial reaction, or partial reaction and subsequently add additional catalyst to effect curing of the mixture. Thus, a weak acid may be used initially to effect partial cure and a stronger acid subsequently added in preparation for final cure.

The above are exemplary of a preferred class of curing agent combination, or prefabricated combination, as exemplified by Example 15, which may be utilized with or without modification of the polyphenylene copolymers. However, as disclosed herein the preferred method is to modify the polyphenylene polymer materials enabling the use of known conventional phenolic resin and amine resin curing agents for the modified polyphenylene polymers or mixtures of polyphenylene resinous materials.

Examples of the preparation of typical chlorinated solvent soluble, fusible copolymers or terpolymers and curing thereof, as embodied herein, are illustrated by the following:

EXAMPLE 1

Phenol (1 mole) and biphenyl (2 mole) are melted together and aluminum chloride (5 mole) is added. The mixture is maintained at about 120±30° C. Cupric chloride (5 mole) is then added portionwise until the reaction is essentially complete and HCl evolution virtually ceases. The polymer mixture is then thoroughly washed with hydrochloric acid (12 N) then with water. The most useful or preferred polymer fraction is then isolated by solvent extraction techniques. A hot extraction using a benzene-naphtha mixture was used to remove the excessively low telomers and unreacted monomers and boiling chlorobenzene was used to isolate the useful fraction of fusible, soluble phenol-biphenyl copolymer.

For amine modification of the above and relatively similar modification of polyphenylene monomers and polymer compositions, one or equivalent mole of N,N-dimethyl aniline, or the like, may be substituted for the phenolic compound and either or both cured with hexamine or other selective or mutually reactive curing agent. Otherwise heat reactive liquid mixtures of polyphenylene polymer materials with the phenolic and amine compounds may be prepared in the manner provided, and a mutually compatible and reactive phenol aramine resin curing agent utilized therewith.

EXAMPLE 2

This example is similar to 1 except that m-terphenyl replaces the biphenyl.

EXAMPLE 3

Similar to Example 1 except that o-terphenyl replaces the biphenyl.

EXAMPLE 4

Similar to Example 1 except that naphthalene replaces the biphenyl.

EXAMPLE 5

Similar to Example 1 except that 1 mole of the biphenyl is replaced by 1 mole of m-terphenyl.

EXAMPLE 6

Similar to Example 1 except that 1 mole of N,N-dimethylaniline is used to replace the phenol.

EXAMPLE 7

Similar to Example 1 except that 3 moles of biphenyl is used rather than 2 moles.

EXAMPLE 8

A mixture of phenol (14.0 g.) and m-terphenyl (35 g.) was prepared and heated to 120° C. To this melt was added anhydrous aluminum chloride (54 g.). After mixing well, cupric chloride (54 g.) was gradually added over a 15-minute period. After stirring for about ½ hour, the viscous polymer was treated with concentrated aqueous hydrochloric acid to remove the inorganic salts. It was then washed with hot water, then twice with cold water. After drying, the polymer weighted 42 g. The polymer was then extracted in a Sohxlet extractor for 24 hours with a mixture of benzene 85% and naphtha 15%. After the soluble low polymers were removed in this manner, the insoluble portion was dried and extracted with boiling chlorobenzene and 15 g. of chlorobenzene soluble polymer was recovered.

EXAMPLE 9

A mixture of 3,3'-diphenylbiphenyl (0.3 mole) phenanthrene (0.1 mole) and N,N-dimethylaniline (0.1 mole) is heated to melting. The temperature is then maintained at about 120±20° C. while anhydrous AlCl₃ (3.0 mole) is added. Anhydrous CuCl₂ (1.0 mole) is then added in portions and after the HCl evolution virtually ceases, the reaction mixture is cooled and digested in concentrated aqueous hydrochloric acid.

After thorough digestion and subsequent thorough water washing, the polymer is washed thoroughly with 10–20% NaOH, then again with water, then dried. Unreacted monomers are then removed by extracting them with a benzene-naphtha mixture. The residual crude polymer is next exhaustively extracted with benzene, toluene, xylylene, chloroform, or chlorobenzene. These hot extractions isolate the desired molecular weight polymer fractions.

EXAMPLE 10 m-Terphenyl (0.1 mole), benzanthracene (0.05 mole), phenol (0.03 mole), and N,N-dimethylaniline (0.02 mole) were melted together and anhydrous aluminum chloride (0.6 mole) was then added. The reaction temperature was set at 130° C. and dry cupric chloride (0.4 mole) was added in small portions. When HCl evolution had largely subsided, the reaction mixture was cooled, then thoroughly scoured with concentrated aqueous hydrochloric acid. The polymer was then washed repeatedly with water then repeatedly with 20% aqueous alkali. After drying, the powder was thoroughly extracted with a mixture of benzene in hexane to remove unreacted monomers and was then exhaustively extracted with hot chlorobenzene. The desired polymer was isolated from the chlorobenzene by drying.

EXAMPLE 11

A sample of phenol-terphenyl copolymer (2 g., M.P. $\simeq$210° C.) prepared in Example 8 was pulverized thoroughly with 0.2 g. ($\simeq$10% by weight) of hexamethylenetetramine. The molding powder was then melted at 230° C. Within seven minutes cure occured and the polymer hardened.

EXAMPLE 12

This experiment is similar to Example 11 except that 0.1 g. of hexamethylenetetramine was used. This sample of molding resin cured within 10 minutes at 230° C.

EXAMPLE 13

This experiment is similar to Example 11 except that a fusible fraction of phenol-biphenyl copolymer (from Example 1) was used. The copolymer-hexamethylenetetramine mixture was found to be cured within an hour.

EXAMPLE 14

Phenol-terphenyl copolymer (10 g., M.P. 210° C.) was pulverized with 0.2 g. of hexamethylenetetramine. Silica 1 g. was then added as an inert filler and the mixture was reground in a mortar. The molding compound was the molded at 200° C. using a pressure of 1000 p.s.i. Pressure was applied only after the molding compound had been B staged several minutes. The molded sample was hard and dense.

EXAMPLE 15

1,4-xylyleneglycol (10 g.), p-toluenesulfonic acid monohydrate (3.3 g.) and chloroform (100 ml.) are stirred and heated at reflux for 20 hours while removing water azeotropically. This solution, when added to a solution of phenol-terphenyl copolymer (20 g., M.P.$\simeq$200–220° C.) in chloroform (100 ml.), constituted a lacquer which was used to impregnate fabrics as glass cloth and cotton cloth. The impregnated fabrics are dried thoroughly and then "B" staged to a state which is dry or substantially dry to the touch, but which is still fusible. Laminates are made from multi-layered stacks of the impregnated fabrics after cutting to shape. The laminates are cured under heat and pressure, to provide machinable laminate structures.

EXAMPLE 16

A 50 ml. sample of lacquer from Example 15 is dried completely and then pulverized. This molding resin was molded at 450° F. and 1000–2000 p.s.i. to yield a hard cured molded specimen.

In preparation of the modified polyphenylene for commercial application in a soluble or dried partially cured resinous state, the following is illustrative:

Examples 11, 12 and 13 show uncured polymer in a fusible powder form, but in which the incorporated curing agent is not soluble in a mutual solvent as the phenolphenylene telomer. Example 15 shows preparation in solvent plus curing agent. Example 16 shows in partial cured state soluble and fusible powder form, plus curing agent.

The modified polyphenylene compositions as herein provided are also applicable to modification and use in admixture with mutually soluble and compatible resinous or natural and synthetic tarry material, as an adhesive or bonding agent for packing and insulation, and other appropriate applicable uses to the art.

Having described the present embodiments of my discovery in accordance with the patent statutes, it will now be apparent that some modifications and variations may be made without departing from the spirit and scope thereof. The specific embodiments described are provided by way of illustration and are illustrative of my discovery, invention or improvements which are to be limited only by the terms of the appended claims.

What is claimed is:

1. The method of preparing chlorinated solvent soluble, fusible copolymers of polyphenylene monomers and polymers and mixtures of said monomers and polymers with phenolic or amine modifiers selected from the group consisting of a phenolic compound or N,N-dialkyl aromatic amine compound, and mixtures of said compounds effecting modified polyphenylene polymers curable as useful copolymer resins with conventional curing agents selected from the group consisting of hexamethylenetetramine, toluenediisocyanate, diglycidyl ether of bisphenol A, a xylyleneglycol and acid combination, and mixtures of said curing agents, said method comprising the steps of preparing a mixture of:

(1) polyphenylene monomers or polymers, and mixtures of said monomers and polymers selected from the group consisting of biphenyl, m-terphenyl, o-terphenyl, quaterphenyl, naphthalene, anthracene, phenanthrene, benzanthracene, mixtures thereof, and mixtures thereof with other fusible phenylene monomers or polymers of not more than about 5 aromatic rings, with (2) a modifier material therefor selected from the group consisting of a phenol compound selected from the group consisting of phenol, phenyl phenol, catechol, resorcinol, naphthol, and meta substituted alkyl or aryl phenol, and mixtures of said compounds, or an aromatic amine compound selected from the group consisting of an N,N-dialkyl aromatic amine compound including a meta substituted alkyl or aryl N,N-dialkylaniline, N,N,N',N'-tetramethyl-p,p'-diaminobiphenyl, and mixtures of the said aromatic amine compounds, and mixtures of the phenol and aromatic amine compounds, including in admixture therewith, (3) A catalyst selected from the groups consisting of ferric chloride, aluminum chloride, and mixtures of said catalyst, said catalyst being in combination with an oxidant selected from the group consisting of cupric chloride, ferric chloride, oxygen, and mixtures of said oxidants, mixing and heating the said mixture at a temperature of about 120° C.±30° C. until evolution of hydrogen chloride virtually ceases, washing the reaction product of said mixture free of said catalyst and oxidant combination, and recovering the chlorinated solvent soluble, fusible modified polyphenylene copolymers.

2. The product produced by the method of claim 1.

3. The method of claim 1 wherein the modifier portion of the mixture is present in an amount of from 1% to not in excess of 90% of the polyphenylene monomers.

4. The method of claim 1 wherein the said modifier of the said polyphenylene polymers is in the relative proportion of from 1% up to about 50% of the polymer composition.

5. The method of claim 1 including the step of mixing with said modified polyphenylene polymers a curing agent therefor selected from the group consisting of hexamethylenetetramine, toluene-diisocyanate, diglycidyl ether of bisphenol A, or a xylyleneglycol and acid combination, and mixtures of said curing agents.

6. The product produced by the method of claim 4 in fusible powder form containing a curing agent therefor selected from the group consisting of hexamethylenetetramine, toluene-diisocyanate, diglycidyl ether of bisphenol A, or a xylyleneglycol and acid combination, and mixtures of said curing agents.

7. The method of claim 1, including the steps of adding and mixing a curing agent selected from the group consisting of a phenol resin curing agent with said phenol modified polyphenylene copolymers and curing the said phenol modified copolymers to a solid state resin.

8. The method of claim 1 including the steps of adding and mixing a curing agent selected from the group consisting of an amine resin curing agent with said amine modified copolymers and curing said amine modified copolymers to a solid state resin.

9. The product produced by the method of claim 1 consisting of a mixture of said modified polyphenylene polymers in combination with a selective or mutually reactive curing agent.

References Cited

UNITED STATES PATENTS

| | | | |
|---|---|---|---|
| 2,954,360 | 9/1960 | Krzikulla et al. | 260—43 |
| 3,042,655 | 7/1962 | Massengale et al. | 260—51 |
| 3,449,429 | 6/1969 | Carrick et al. | 260—576 |

FOREIGN PATENTS

| | | |
|---|---|---|
| 1,000,679 | 8/1965 | Great Britain. |

MELVIN GOLDSTEIN, Primary Examiner

U.S. Cl. X.R.

260—2 H, 33.8 R, 47 EP, 51 R, 72.5, 576, 619 B